Figure 1:
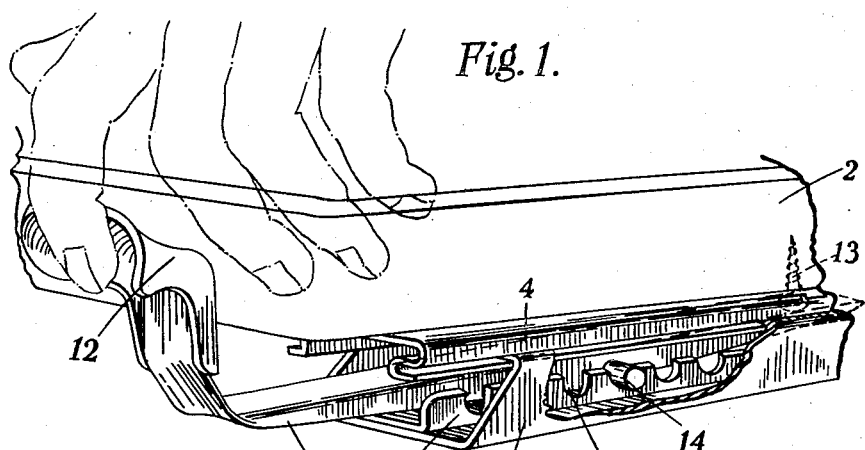

Aug. 7, 1934.  A. W. CHAPMAN  1,969,353
SLIDABLE SEAT FOR VEHICLES AND THE LIKE
Filed Sept. 13, 1929

INVENTOR
Arthur William Chapman
BY
Charles H. Kisler
ATTORNEY

Patented Aug. 7, 1934

1,969,353

UNITED STATES PATENT OFFICE 1,969,353

SLIDABLE SEAT FOR VEHICLES AND THE LIKE

Arthur William Chapman, Putney, London, England

Application September 13, 1929, Serial No. 392,305
In Great Britain September 28, 1928

12 Claims. (Cl. 155—14)

This invention relates to slidable seats for vehicles and the like. Amongst the various seats to which the invention may be applied are adjustable seats of motor cars which can be moved to allow ready access to a door or for other purposes and seats for motor cars known as "occasional seats".

More particularly, the invention enables the seat to be moved in either direction away from the normal position both forwardly and rearwardly, to enable, for instance, a person to pass either in front of or behind the seat.

According to my present invention, therefore, I provide a locating element independent of the movement of the seat adapted to co-operate with another element carried upon or capable of moving with the seat, means whereby the said elements can interengage so as to lock the seat against sliding movement until released, the seat then being able to move in either direction relative to the locating element, and means whereby one of the elements may be adjusted for the purpose of enabling the locked position of the seat to be varied. The engagement of the said elements is preferably automatic when the elements are in the correct relative position for engagement.

Describing one form of application of my present invention to a motor car seat by way of example only, two parallel rails are fastened down upon the floor of a car for the seat frame to slide upon, and one of these rails is furnished with a series of holes, into a chosen one of which a pin or equivalent is inserted. This pin or the like forms the stop or locating element, the same being engaged by a pivoted catch mounted directly or indirectly on the seat frame. This catch, in the example under consideration, is a bar, plate or lever with a deep notch in a protuberance on its edge and a spring or equivalent device urges such protuberance constantly over the near edge of the rail, a stop being provided to prevent it swinging too far across the rail. When the catch is carried (by the sliding movement of the seat) along the rail, its protuberance overhangs the line of the series of holes, so that it rides upon the pin or the like, receiving from it a glancing blow by which it is displaced only to recover itself instantly afterwards when the notch comes opposite the pin and the spring or equivalent causes the catch to envelop or embrace the pin on both sides with its notch, conveniently of U-formation, so locking the catch to the pin. As will be seen, this engagement of the catch with the pin or the like is automatically performed by sliding the seat along its rail. In order to release the seat it is only necessary to disengage the catch, whereupon the seat may be slid either backwards or forwards at will within the extreme limits of travel. Whether the seat has been slid forwards or backwards, there will never be any difficulty in assuring its restoration to its normal and desired position, as the catch will not slide past the stop pin but will snap round the pin automatically.

The form of catch may be varied in any desired manner. For instance the U-notch above mentioned may be so designed as to enable one side of the U to be moved independently of the other side, thus leaving the stop acting in one direction only until both sides of the notch have been moved. The catch may be duplicated i. e. with one plate spaced above the other to embrace the rail at top and bottom and thereby serve as a retainer, or the rail itself may be double (or channelled) so as to guide the catch and ensure its co-operation with the pin. The catch may be mounted directly or indirectly on the seat, and the rail carrying the pin or equivalent on the floor of the car, or vice versa. The catch may, furthermore, be adjustable instead of or as well as the pin being adjustable. The catch instead of working horizontally, as described, may, together with the pin, be arranged to work at right angles or at any other angle.

In a preferred form of the invention, the catch consists of a bar arranged to work vertically, so as to engage or be engaged by a pin or the like lying horizontally and transversely in a recess in the rail out of which it can be lifted and placed in another recess, if a change of adjustment is desired. The catch need not be pivoted, so long as it is in the form of a bar capable of an up-and-down movement at one end and fixed at the other end. The inherent resiliency of the catch bar may be relied upon to keep the bar in normal engagement with the pin, or, in some cases, the weight of the bar may suffice, or a spring may be supplied.

Reference will now be made to the accompanying drawing illustrating the preferred form of the invention. Fig. 1 is a fragmentary view of a corner of a seat showing a portion of the rail broken away to expose the interior.

Figure 2:
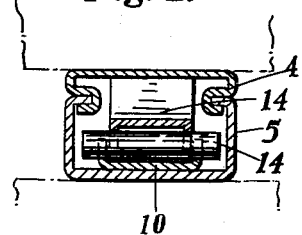
Figure 3:
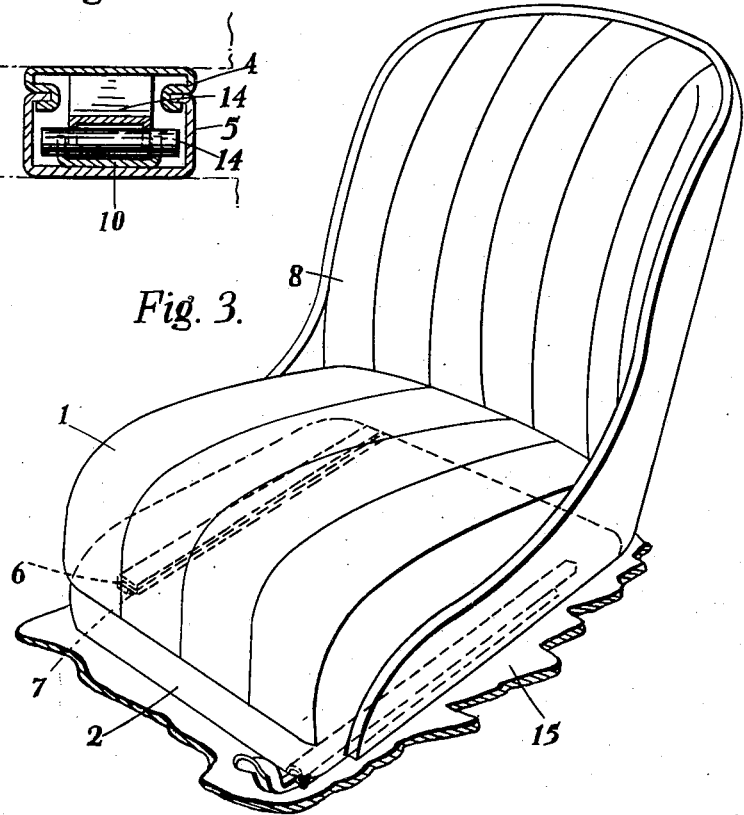

Fig. 2 is a cross section of this form of the invention, whilst Fig. 3 is a perspective view of a seat to which the same has been fitted.

In the drawing, 1 represents the cushioned portion of the seat and 8 the seat back. On the bottom of the base or frame 2 of the seat are firmly secured two longitudinal angular strips (hereinafter called "slides") 4, 6, which are spaced parallel to one another at a sufficient distance apart to form a stable base.

Under the slide 4 there is a rail or slide 5 which is screwed or otherwise fastened down upon the floor 15. There is also a rail 7 (Fig. 3) under the slide 6. These slides and rails make hooked engagement with one another so that they cannot be separated ordinarily, but are adapted to slide in relation to one another. This interengagement of the slide and rail may be produced in various ways, two of which are shown in the drawing. The slide 4 is shown with a Z-channelled edge and the rail or slide 5 is in the form of a channel with sides and inturned edges, such edges engaging the externally open channel of the slide 4. The combination of the slide 4 and rail 5 forms a kind of box or enclosure for containing the locking mechanism yet to be described. The other slide 6 and its rail 7 need not be of this same pattern. As illustrated they consist of a plain flat rail 7 and a slide 6 adapted to hook on to one side of the rail, which is sufficient to prevent the rail and slide from separating by an upward pull.

Describing the locking mechanism in detail, this comprises a channelled metal strip 10 securely fastened down upon the floor of the channelled rail 5 and having a row of recesses 9 in its vertical sides, so as to form a kind of rack for receiving a pin 14 which rests transversely in any pair of opposite recesses into which it is laid. A catch bar 11 extends from a point in the front of the seat rearwardly inside the box comprised by the slide 4 and rail 5 to a point where it is fastened, such as by a screw 13, through the slide and into the base of the seat, or it may be riveted or otherwise secured to the slide 4 only. The forwardly protruding end of the catch bar 11 is left free and it carries a finger-piece 12 by which it can easily be lifted a small distance. The catch bar 11 may be solid or channelled, but preferably the latter, its sides being directed downward and each formed with a notch or groove at an intermediate point in its length so that such notches or grooves will drop or spring down upon and enter into locking engagement with the pin 14 when brought opposite the latter. This engagement will come about automatically owing to the normal tendency of the bar 11 to move downwards. The edge portion or protuberance of the channel member or lever 11 tapers from the notches forwardly and rearwardly to provide cam or guiding portions for facilitating the movement of the notches into interengagement with the pin 14 from either direction, and to allow the seat to be moved in either direction when released. So long as the notch of the bar 11 is in engagement with the pin 14, the bar, and consequently the seat frame 2 to which it is fastened, is held locked against sliding movement.

In order to set the seat free to slide either forwards or backwards, all that is necessary to be done is to raise the finger-piece 12, thus lifting the bar 11 above the level of the pin 14. After the seat has been shifted even a slight distance whether forwards or backwards, the finger-piece 12 may safely be released, as the pin 14 will cease to register with the notch in the bar 11, and the bar 11 will then merely slide upon the pin 14 without being locked by it, whilst the seat is being slid to any desired distance. The seat will resume its original position automatically if it is simply caused to slide upon the rails 5, 7, for directly the notches in the catch bar 11 come opposite the pin 14 again the catch bar will drop into engagement.

The pin 14 may be transferred to any other of the recesses 9 if a readjustment of the usual position of the seat is required. This readjustment can best be done by first sliding the seat with the bar 11 completely away from the rack or series of recesses 9, and then lifting the pin 14 and placing it in the desired position more to the front or to the back, as the case may be.

Instead of having recesses 9 in the channelled strip 10 the latter may be dispensed with, and a series of holes may be provided in the sides of the channelled rail 5 itself for the purpose of accommodating a locating pin, which can be inserted from the side where desired.

The reference to slidable seats is to be taken as indicating the type generally, without involving any special kind of slides. The rail carrying the pin or such like stop may itself serve as a slide upon which the seat may run as described, or the rail may be a special one which does not take the weight of the seat. If desired the catch bar may have more than one locating notch at different points in its length. Alternatively, two or more locating pins or the like may be used in co-operation with a catch bar having one or more notches.

When the invention is applied to seats which turn on a pivot, the same elements above referred to will be carried upon the parts which slide in a circumferential direction, circular or segmental slides taking the place of straight slides, or, if straight slides are used, they would require to be hinged to accommodate themselves to the rotary movement of the seat.

I claim:

1. A device of the character described comprising relatively movable supporting and seat members, and locking means on said members including cooperating anchoring and catch elements, said anchoring element being relatively adjustable on the member supporting the same to vary the locking position of the seat member for leg length over an intermediate portion of the range of movement thereof, said elements when released being positioned to allow movement of the seat member in both directions beyond the locking points, and one of said elements including means adapted to ride over the other element from either direction for relatively guiding the elements into engagement upon return of the seat member from either direction.

2. A device of the character described comprising relatively movable members, and locking elements one of each of said members and interengaging to lock said members against relative movement, one of said elements including guiding means at opposite sides of the interengagement point thereof adapted to ride over the other element upon relative movement of said members into locking position from either direction, and one of said elements being relatively adjustable on the member carrying the same along the path of movement to vary the locked position of the members.

3. A device of the character described comprising relatively movable members, and cooperating locking elements one on each of said members movable into engagement for locking the members against movement, certain of said elements including means to render the same adjustable relative to the member supporting the same along the path of movement of the members for varying the relative locking positions thereof, and one of said elements having a portion adapted to interengage the other element and portions at opposite sides of said interengaging portion for relatively guiding the elements into engagement upon relative movement of the members from either direction, said guiding portions being effective in guiding the elements into interengagement at all positions of adjustment of said elements, and, upon release of the members, allowing relative movement thereof in either direction.

4. A device of the character described comprising relatively sliding supporting and seat members, an anchoring element on one member, means for retaining said element in various adjusted positions along the path of travel of the seat member, and a catch element on the other member biased towards the anchoring element and having a portion adapted to interengage the anchoring element to lock the seat member and portions at opposite sides of the interengaging portion for relatively guiding the elements into interengagement to lock the seat member in any adjusted position of the anchoring element upon movement of the seat member from either direction.

5. A device of the character described comprising relatively movable members, and locking elements carried thereby one on each and including means interengaging in one position only of the elements relative to each other to lock the movable member, one of said elements including means for rendering the same relatively adjustable along the line of movement of the movable member to enable the movable member to be locked by said elements at various points along said line of movement, and the other element including means at opposite sides of the interengaging point thereof for relatively guiding the elements, irrespective of the relative adjusted positions thereof, into the single interengaging position thereof upon movement of the movable member from either direction, and for allowing movement of the movable member upon release in both directions to positions beyond the locking positions.

6. A device of the character described comprising a support, a seat member slidable thereon, a locating element on the support adjustable over an intermediate portion of the range of movement of the seat member, and a catch element carried by the seat member for engaging said locating element in each position thereof, said elements interengaging at one point thereof, and one of said elements including means at opposite sides of the interengaging point adapted to ride over the other element for insuring such interengagement upon movement of the seat member to locked position from positions beyond the locating element at both sides thereof.

7. A device of the character described comprising a supporting member, a seat member movable thereon, a locating element, a locating element supporting member on one of said first named members having a series of portions disposed along the line of travel of the seat member for receiving said locating element in any thereof, and a lever connected at one end to the other of said first named members, and having an intermediate portion adapted to interengage said locating element and portions at opposite sides of the intermediate portion for relatively guiding the locating element and lever into interengaging relation as the seat member is moved into locked position from either direction.

8. A device of the character described comprising a supporting member, a seat member movable thereon, a transverse pin constituting a locating element on one of said members, a channel-shaped lever connected at one end to the other of said members and having an intermediate recess in the edges thereof adapted to receive said pin in certain of the positions of the seat member, said lever and pin upon disengagement thereof being relatively movable in either direction with the seat, and said channel edges tapering from the recess towards the ends of the lever and being adapted to relatively ride over the pin for relatively guiding the pin and recess into engagement upon movement of the seat into locked position from either direction, and means at the forward end of the lever for manually disengaging the same.

9. A device of the character described comprising a supporting member, a seat movable thereon, a locating pin, means on the supporting member having a series of pin receiving portions for retaining said pin in any of various positions along the line of travel of the seat member, and a catch carried by the seat member and arranged to engage the pin in any of the various positions thereof to positively hold the seat, and to be disengaged to allow movement of the seat in either direction relative to the pin.

10. A device of the character described comprising a supporting member, a seat movable thereon, a transverse locating pin on said supporting member adjustable to various positions along the line of travel of the seat member, and a catch carried by the seat, and having a pin engaging recess therein, said catch and said pin upon disengagement thereof allowing movement of the seat in either direction relative to the pin, and said catch having guiding portions at opposite sides of the recess for guiding said catch over the pin to cause engagement of the recess with the pin in any of the various positions thereof to positively hold the seat upon movement thereof into locked position from either direction.

11. A device of the character described comprising a supporting member, a seat member movable thereon, a member on said supporting member having a series of recesses therein arranged along the line of travel of the seat member, a pin carried by said last named member and received into one of said recesses in adjusted position, and a catch on the seat member adapted to engage and disengage said pin in any of the adjusted positions thereof.

12. A device of the character described comprising a pair of slides shaped to form a box-like enclosure open at the forward end, and having longitudinal edge portions formed for interlocking sliding engagement, a member disposed within said enclosure upon one slide and having a longitudinally arranged series of recesses therein, a locating pin adapted to be received into any one of the recesses, and a lever within the enclosure suitably connected to the other slide towards the rear thereof, and projecting through the forward opening, said lever being biased for movement towards said pin and having a recess therein adapted to interengage with said pin, and portions at opposite sides of the recess for guiding the parts into locking engagement upon relative movement of the slides from either direction.

ARTHUR WILLIAM CHAPMAN.